June 30, 1970   E. J. ROBERT   3,518,512
VARIABLE CAPACITOR
Filed May 6, 1968

INVENTOR:

ELIE J. ROBERT

BY: *A. H. McCarthy*

HIS AGENT

018 United States Patent Office 3,518,512
Patented June 30, 1970

3,518,512
VARIABLE CAPACITOR
Elie J. Robert, Kemah, Tex., assignor to Shell Oil Company, New York, N.Y., a corporation of Delaware
Filed May 6, 1968, Ser. No. 726,896
Int. Cl. H01g 5/16
U.S. Cl. 317—257      4 Claims

ABSTRACT OF THE DISCLOSURE

The input capacitance of the trigger electrodes of a flashtube is varied to stabilize the flashtube firing. An apparatus for varying the input capacitance consists of a plurality of finger-like conductors, one attached to each of the pins of the flashtube socket, forming one plate of the input capacitor while a metal cylinder positioned concentrically with the plurality of conductors and movable with respect thereto forms the other plate of the input capacitor.

BACKGROUND OF THE INVENTION

The present invention relates to electronic gas-discharge flashtubes having a plurality of trigger electrodes; more particularly, it relates to a capacitive coupling between the trigger electrodes and external circuitry.

A continuing problem associated with using gas-discharge flashtubes is their tendency to either not fire or fire erratically. That is, flashtubes when working properly will fire every time a triggering signal is received and only when a triggering signal is received. When the operation is otherwise, i.e., erratic, serious problems may develop in some applications. This is particularly true when the applications for the flashtube require precision firing, as for example, where flashtubes are used as a strobotron or to make time marks for seismic records. It is therefore an object of this invention to provide a way of improving the firing reliability of gas-discharge flashtubes.

Electronic gas-discharge flashtubes which will be referred to hereafter as flashtubes generally consist of an hermetic glass envelope containing a suitable gas, such as xenon, and an electrode system for producing an arc discharge in the gas. The electrodes are of two basic types: two main, heavy electrodes between which the main arc is established, and a plurality of fine-wire trigger electrodes that extend into the space between the main electrodes and initiate the arc discharge by ionizing the gas along a path between the main electrodes.

The main electrodes are connected to a large capacitor that serves as an energy reservoir for the flash. A high-voltage triggering signal is coupled to the trigger electrodes by input capacitors. Up until now, the input capacitors used on flashtubes have been of the fixed value type. This is true because those skilled in the art have not recognized or understood the significant part that input capacitors play in the successful operation of flashtubes. Specifically, what others skilled in the art have failed to discover and what is to be pointed out by this invention is that if these capacitors are too small in value, ionization will not take place or will take place erratically.

On the other hand, if the capacitors are too large in value, similar results have been observed to happen. For example, where a direct current supply of 600 volts or more is needed to obtain an adequate intensity of light, erratic triggering is apt to be encountered.

An obvoius solution would be to pick a value of capacitance that is neither too small nor too large. But this is presently impossible since the electrode geometry and gas pressure cannot be controlled to sufficiently tight tolerances during manufacture to permit a fixed value of the capacitors to be used. This is true because tubes vary one from another and because the input capacitance requirements of a given tube change as the tube ages. Thus, unless one is prepared to live with erratically firing tubes, an impossibiltiy in some applications, or is willing to buy and discard many tubes to find one whose characteristics match the fixed input capacitors, there is no presently available solution. It is therefore an object of this invention to provide an economical way of improving the firing reliability of gas-discharge flashtubes.

A further object of this invention is to provide a variable trigger input capacity assembly.

A further object of this invention is to provide a way of increasing the useful lifetime of flashtubes.

And finally, an object of this invention is to provide a specific variable capacitor configuration for use with xenon flashtubes.

SUMMARY OF THE INVENTION

These and other objects of this invention may be accomplished by a variable capacitor arrangement coupling the triggering signal to the trigger electrodes. The flashtube is operated under normal conditions until the firing of the tube becomes erratic. The variable capacitors is then adjusted until erratic firing is eliminated.

BRIEF DESCRIPTION OF THE DRAWINGS

A more detailed explanation of the invention will be given with respect to the drawings wherein.

DESCRIPTION OF THE PREFERRED EMBODIMENT

Figure 1:
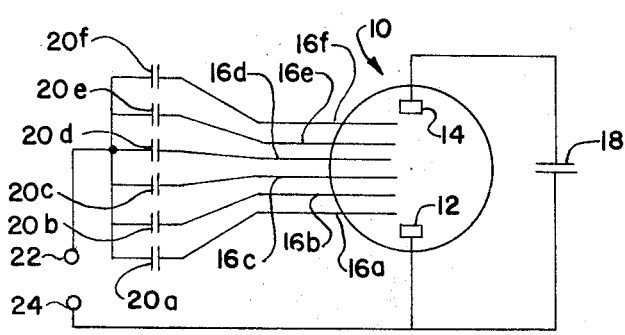
FIG. 1 is an equivalent circuit of an electronic gas-discharge flashtube with some of the associated circuitry.

Referring now to FIG. 1, an electronic flashtube 10 is provided with two primary or heavy electrodes consisting of a cathode 12 and an anode 14 between which the main arc is established. A plurality of trigger electrodes 16a–f are positioned in the gap between the cathode and anode. The cathode and anode are connected to a large energy reservoir capacitor 18 which is charged to a high voltage, for example, around 600 volts, by an external power supply (not shown) before each discharge of the flash tube. The trigger electrodes 16a–f are respectively connected to one terminal of trigger electrode capacitors 20a–f. The other electrodes of capacitors 20a–f are connected to a common terminal 22. A reference terminal 24 common with cathode 12 and one side of capacitor 18 is also provided.

After capacitor 18 has been fully charged, its voltage appears across cathode 12 and anode 14. The flash tube 10 may then be fired by applying a high-voltage triggering signal, typically 5 to 20 kilovolts, between terminals 22 and 24. The triggering signal is transmitted through capacitors 20a–f to trigger electrodes 16a–f. The main flash break-down occurs first between cathode 12 and trigger electrode 16a. The break-down then follows a path outlined by trigger electrode 16b, 16c and so on until it reaches anode 14.

Functionally, capacitors 20a–f act firstly as isolation capacitors. When the break-down has occurred between cathode 12 and trigger electrode 16a, a low impedance path is created between those two elements such that the potential on trigger electrode 16a will be essentially that on cathode 12. Without the presence of capacitors 20a–f, there would exist a low impedance path between electrodes 16b–f and cathode 12, and continued break-down would not occur.

In addition to the isolating function described above, capacitors 20a–f perform the very critical function of coupling the triggering signal to the trigger electrodes. And for this function, capacitors 20a–f must be made variable.

Figure 2:
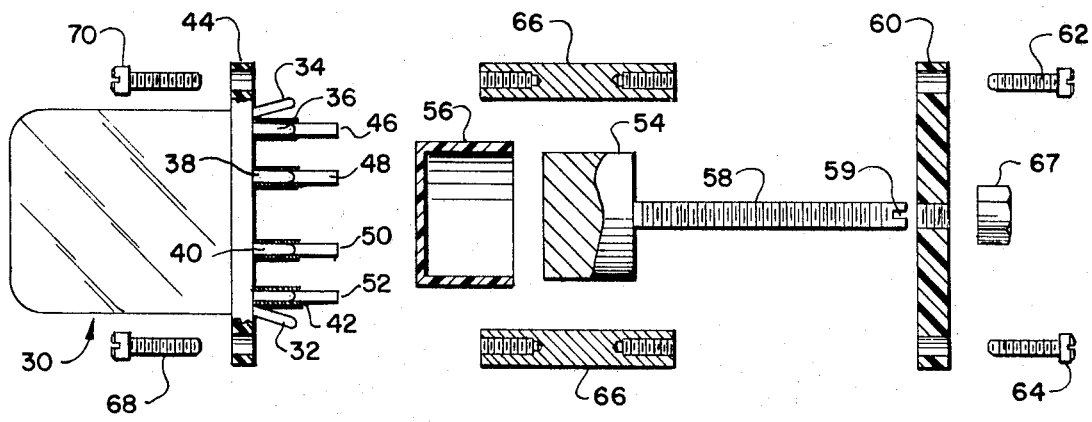
FIG. 2 is an exploded view of a variable capacitor arrangement for carrying out the present invention.

FIG. 2 is an exploded view of one embodiment wherein capacitors 20a–f have been made variable in an advantageous and economical way. Referring now to FIG. 2, a flashtube is shown generally at 30, and may have a plurality of output pins of which only six are shown in the drawing for the sake of clarity. Pin 32 and pin 34 are shown to be bent outwardly, and are electrically associated with cathode 12 and anode 14. Pins 36, 38, 40 and 42 are electrically associated with trigger electrodes 16a–d. And again in reality it is understood that electrodes e and f would also have pins associated therewith.

The flashtube 30 is mounted in a commercially available 9-pin miniature tube socket that in turn is cemented to a support member 44 made of a good electrical insulating material such as epoxy-filled fiberglass. Pins 36 through 42 are extended by pin extension means 46 through 52 respectively to form one plate each of the trigger capacitors. Pin extension means 46–52 should be made of a good conducting metal such as brass, aluminum, or the like.

The other plate of the capacitor is formed by the metal cylinder 54 over which a thin insulating tube 56 closed at the end towards the flashtube is positioned to serve as the capacitor dielectric. Tube 56 may conveniently be made of plastic.

Cylinder 54 may be moved backward and forward with respect to pins 32 through 42 and pin extension means 46 through 52 by means of screw 58 which engages metal plate 60 mounted by means of screws 62 and 64, insulating standoffs 66, and screws 68 and 70 to support member 44. A screw slot 59 permits adjustments to be made with an installing tool while the system is in operation. In this way the firing characteristics of the electronic flashtube may be stabilized. That is, the flashtube is fired under normal operating conditions until the firing becomes erratic. Then the input capacitance to the trigger electrodes is varied until erratic firing is eliminated. When the proper setting has been found, lock nut 67 holds the setting. The high-voltage triggering signal is applied to plate 60 by a solder connection or by a lug either under screw 62 or 64.

Screws 68 and 70 are provided to fasten standoffs 66 to support member 44. The arc sustaining electrodes 32 and 34 may be bent away from the center and connected by flexible electrical leads to the energy reservoir capacitor 18.

Figure 3:
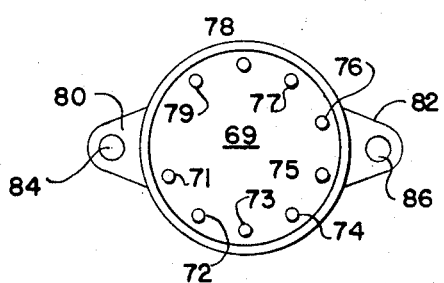
FIG. 3 is an end view of a tube socket and annular support.

FIG. 3 illustrates one embodiment of support member 44. Nine holes, 71 through 79, are drilled in member 69. Attached to member 69 are flanges 80 and 82 with holes 84 and 86 drilled therein to receive screws 68 and 70 (see FIG. 2). Holes 71 through 79 are positioned so as to receive the pins of the flashtube.

The holes adapted to receive pins associated with trigger electrodes of the flash tube must be fitted with pin extensions. The pin extensions are of a conducting material and are provided to increase the capacitive coupling over what it would be with the pins alone.

Figures 4, 5:
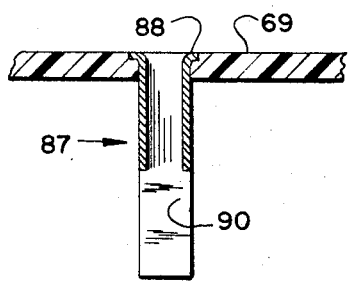
FIG. 4 is an elevation view partially in cross-section of a pin extension strip.
FIG. 5 is an elevated cross-sectional view of a pin extension strip positioned in a tube socket.

One possible pin extension configuration is shown in FIG. 4. The pin extension 87 is sleeve like in the upper portion, flanged 88 at the top, and is a flat metal strip 90 at the bottom. Pin extension 87 is, of course, adapted to fit into the holes in body 69 and to receive pins from the flashtube and is referred to by reference numerals 46–52 in FIG. 2. FIG. 5 shows extension 86 fitted into member 69. It may be cemented in or fitted and peened over.

Figure 6:
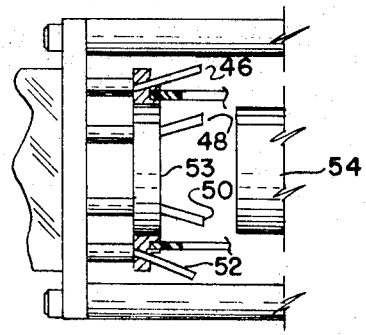
FIG. 6 illustrates an alternative means for making the electrodes movable with respect to each other.

FIG. 6 illustrates an alternative means for making the electrodes movable with respect to each other. Spring brass or phosphor bronze pin extension means 46 through 52 are used, and an insulating slideable collar 53 is positioned between the pin extension means and the cylinder 54. The pin extension means can then be spread radially away from the cylinder by advancing the collar toward support member 44 while cylinder 54 remains stationary. In this embodiment, cylinder 54 is not movable with respect to the flashtube.

Obviously, the capacitance of a capacitor may be changed by any one of a member of means, such as changing the separation of the plate, changing the size of the plates, changing the dielectric, etc. Only two techniques for changing the capacitance of capacitors 20a–20f have been specifically described, and it is recognized that other approaches are possible. However, any such alternative techniques are within the scope of this invention that is defined in the following claims.

I claim as my invention:

1. A variable capacitor for controlling the voltage applied to a plurality of trigger electrodes of a xenon electronic flashtube where the trigger electrodes make contact with external circuitry through output pins located in the base thereof, said capacitor comprising:

a support member having a plurality of elongated metal pin sockets formed therein, said pin sockets being adapted to receive the flashtube output pins;

pin extension means connected to said pin sockets and extending outwardly from said support member to collectively form a first electrode of said capacitor, said pin extension means consisting of longitudinally extending conductors;

a housing connected to said support member;

a second electrode insulatably connected to said housing, spaced from said first electrode, spaced from said support member, and electrically communicable with said first electrode, a dielectric material disposed between said first and said second electrodes; and adjustment means connected to said second electrode for adjusting the spaced relationship between said first and second electrode.

2. The variable capacitor of claim 1, wherein:

said first electrode comprises said pin extension means located adjacent the circumference of said support member; and said second electrode comprises a cylinder concentric with and contiguous to said first electrode and longitudinally adjustable with respect thereto.

3. The variable capacitor of claim 2, wherein:

said housing comprises a plate mounted to said support member by insulating standoffs such that said plate is substantially parallel to said support member and axially aligned, said plate being provided with a threaded hole in the center thereof; and said adjustment means comprises a screw member engaging the threads of said hole and movable with respect to said plate, one end of said screw member being axially mounted to said cylinder whereby said cylinder is made axially movable with respect to said extension means.

4. The variable capacitor of claim 3, wherein said pin sockets and pin extension means are integral and consist of a sleeve flanged at one end and extending into a flat metal strip at the other end.

References Cited

UNITED STATES PATENTS

| | | | |
|---|---|---|---|
| 1,655,784 | 1/1928 | Garcia | 317—249 |
| 2,748,328 | 5/1956 | Font | 317—257 |
| 3,253,240 | 5/1966 | Roussin | 317—259 X |

ELLIOT A. GOLDBERG, Primary Examiner

U.S. Cl. X.R.

317—249